United States Patent [19]
Wilkins

[11] Patent Number: 5,294,917
[45] Date of Patent: Mar. 15, 1994

[54] LIQUID LEVEL SENSOR USING FLOAT AND MAGNETIC MEANS

[76] Inventor: Larry C. Wilkins, 1601 Heddon Ct., New Albany, Ind. 47150

[21] Appl. No.: 863,003

[22] Filed: Apr. 6, 1992

[51] Int. Cl.⁵ .................................. G08B 21/00
[52] U.S. Cl. ........................... 340/625; 340/623; 73/308; 73/311; 73/317; 200/84 C
[58] Field of Search .............. 340/618, 623, 624, 625; 73/305, 306, 307, 308, 317, 319, 322.5, 311; 200/84 A, 84 C

[56] References Cited

U.S. PATENT DOCUMENTS

| | | | |
|---|---|---|---|
| 2,777,914 | 1/1957 | Brown | 340/623 X |
| 3,820,098 | 6/1974 | Demyon et al. | 340/625 |
| 4,591,837 | 5/1986 | Martinez | 340/624 |
| 4,924,703 | 5/1990 | White et al. | 340/624 X |

*Primary Examiner*—Jeffrey Hofsass
*Attorney, Agent, or Firm*—Woodard, Emhardt, Naughton, Moriarty & McNett

[57] ABSTRACT

A float-operated switch assembly is mounted in an opening in the top of a tank. It includes a vertical non-magnetic pipe having a pair of floats normally hanging beside it. Each of the floats has a magnet thereon normally in a position proximate the pipe when the float is down. A magnetic field between this magnet and a switch operator support magnet inside the pipe normally holds the latter magnet in a set position. The floats are located at a height such that, when the liquid has risen to the desired upper limit, the rising liquid has caused the floats to swing up and outward from the pipe, pulling their respective magnets out of supporting relationship to the switch operator support magnet whereupon the support magnet drops and a switch is operated for activating a signal circuit. A manual test knob is provided to remotely, manually lift the floats. A fiber optic rod is associated with an indicator on the switch actuator to show when the switch operator has been actuated during a test procedure or as a result of rising liquid level.

18 Claims, 10 Drawing Sheets

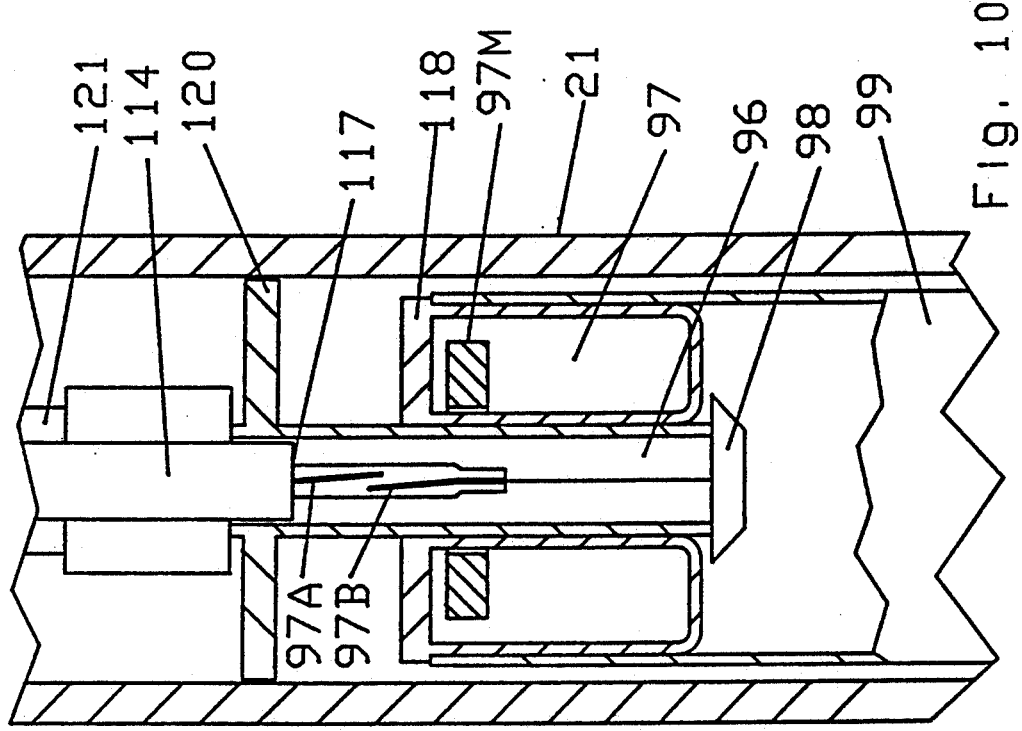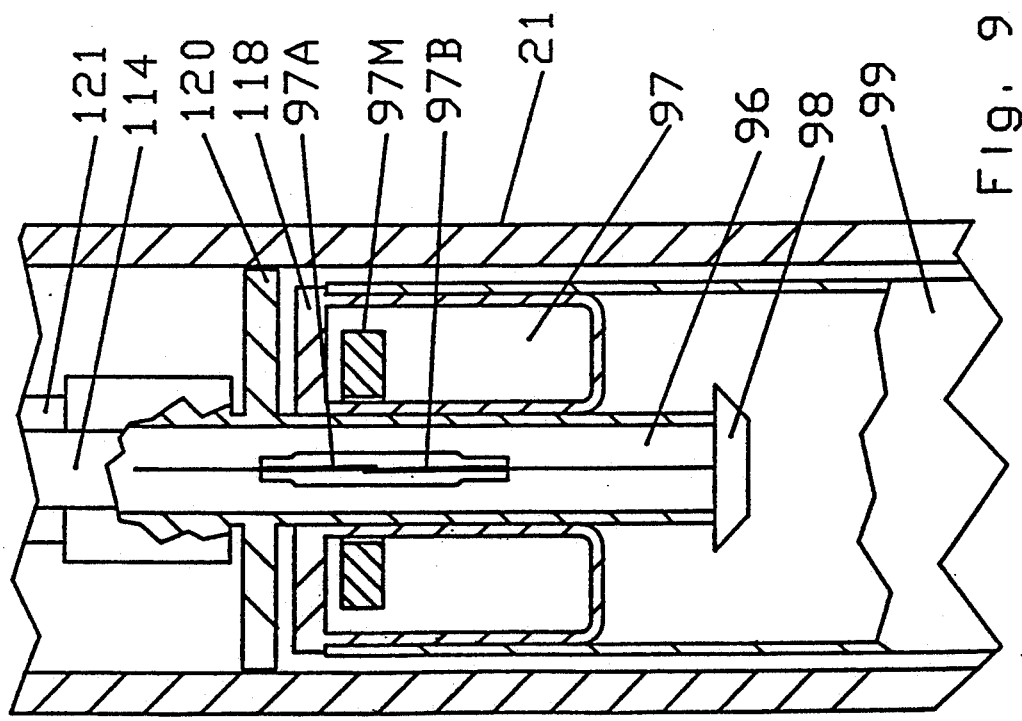

LIQUID LEVEL SENSOR USING FLOAT AND MAGNETIC MEANS

BACKGROUND OF THE INVENTION

1. Field of the Invention

This invention relates generally to liquid level sensors and alarms for containers of liquids, and more particularly to a sensor and alarm useful in the holds of barges and the like.

2. Description of the Prior Art

It is important that large containers of liquid not be overfilled, for several reasons. In the past, it was acceptable practice to leave open the top access hatches in large containers such as the holds of tankers and barges, particularly during filling operations, to avoid generation of pressures in the holds during the filling operations as the volume of liquid content increases and the remaining tank volume for vapor decreases. The vapor was simply permitted to escape to atmosphere. Because the vapors of many types of materials are considered environmentally objectionable, even if not particularly dangerous in the sense of flammability or corrosive nature, governmental authorities have imposed restrictions such that the holds of vessels must be sealed closed during filling operations. Accordingly, if provisions made for removing vapor during filling operations are inadequate, the pressure in the hold will rise. Many, if not most, large volume liquid cargo tanks cannot withstand very significant internal pressures. For some of them, three pounds per square inch is the maximum tolerable internal pressure.

Although spill valves have been employed to enable contents to spill out from openings in the top of such tanks if they are filled excessively, or if the vapor pressure rises too much, it is preferable to employ some means to determine the amount of fill in such a tank. One method for doing so has been to employ a cylindrical float in the tank and which rises and falls with the level of the liquid therein. As the float rises and falls, it is centered and guided on an upstanding cylindrical pipe fixed in the tank. A magnetic reed switch is mounted inside the pipe Magnet means of one or more varieties are mounted in the float so that, if the float rises to a certain level it will close the reed switch and turn on some kind of signaling device. There are several disadvantages with this type of system. The float performance is influenced by the viscosity of the material in the tank and/or any accumulation of dirt, foreign matter, degraded cargo content or other impediment which may have accumulated either on the guide hole in the float or on the guide pipe itself. Due to the gap necessary (although small) between the pipe and the float to permit the float to reasonably freely move up and down on the pipe, and since the reed switch is inside the pipe and the magnet is inside the float, and due to the wall thicknesses of the pipe and float, the distance between the magnet and the reed switch is fairly significant. Consequently, a comparatively large magnet must be used to properly operate the switch. But it is possible that prolonged influence of the comparatively large magnet on the switch will magnetize the switch so that it will remain actuated even when the float has moved away from the switch.

With the above-mentioned conventional system, testing in the field is usually done by means of a test rod which engages the float and lifts the float to see if the switch is operated at some point as the float is lifted. But it is difficult or impossible to test the assembly for performance of the float itself. It may appear to be functioning properly when using the test rod; however in actual conditions the device may be inoperative for many reasons. The float may have enough gummy material between it and the shaft that it cannot rise due to the bouyancy alone, although the test rod will move it. The float may have a hole in it so that it is actually sunk and has no bouyancy. The float may be partially filled with fluid and will rise too late. The present invention is directed to overcoming one or more of the above-mentioned disadvantages of the prior art.

SUMMARY OF THE INVENTION

Described briefly, according to a typical embodiment of the present invention, a float-operated switch assembly is mounted to the top of the cargo hold or to a tube mounted to the top of the cargo hold. The switch assembly includes a support column having a pair of floats pivotally mounted thereto and normally hanging at each side of the support column but swingable outwardly and upwardly therefrom upon floatation by the rising liquid in the cargo hold. Each of the floats has a magnet unit associated therewith operable from a position adjacent the column when the float is down, to a position remote from the column when the float is up. When either float rises to the level at which an alarm should sound, the magnet unit releases a switch operator magnet to close an alarm circuit. A manual test knob is provided to remotely, manually lift the float and to reset the assembly. A fiber optic rod is associated with an indicator on the switch operator to show when the switch has been actuated during a test procedure or as a result of rising liquid level. The actuated condition of the switch is maintained, until resetting.

BRIEF DESCRIPTION OF THE DRAWINGS

FIG. 9 is a further enlarged fragment of FIG. 4 and shows the magnetic reed switch with contacts closed.

FIG. 10 is a further enlarged fragment of FIG. 5 and shows the magnetic reed switch with contacts open.

DESCRIPTION OF THE PREFERRED EMBODIMENT

Figure 1:
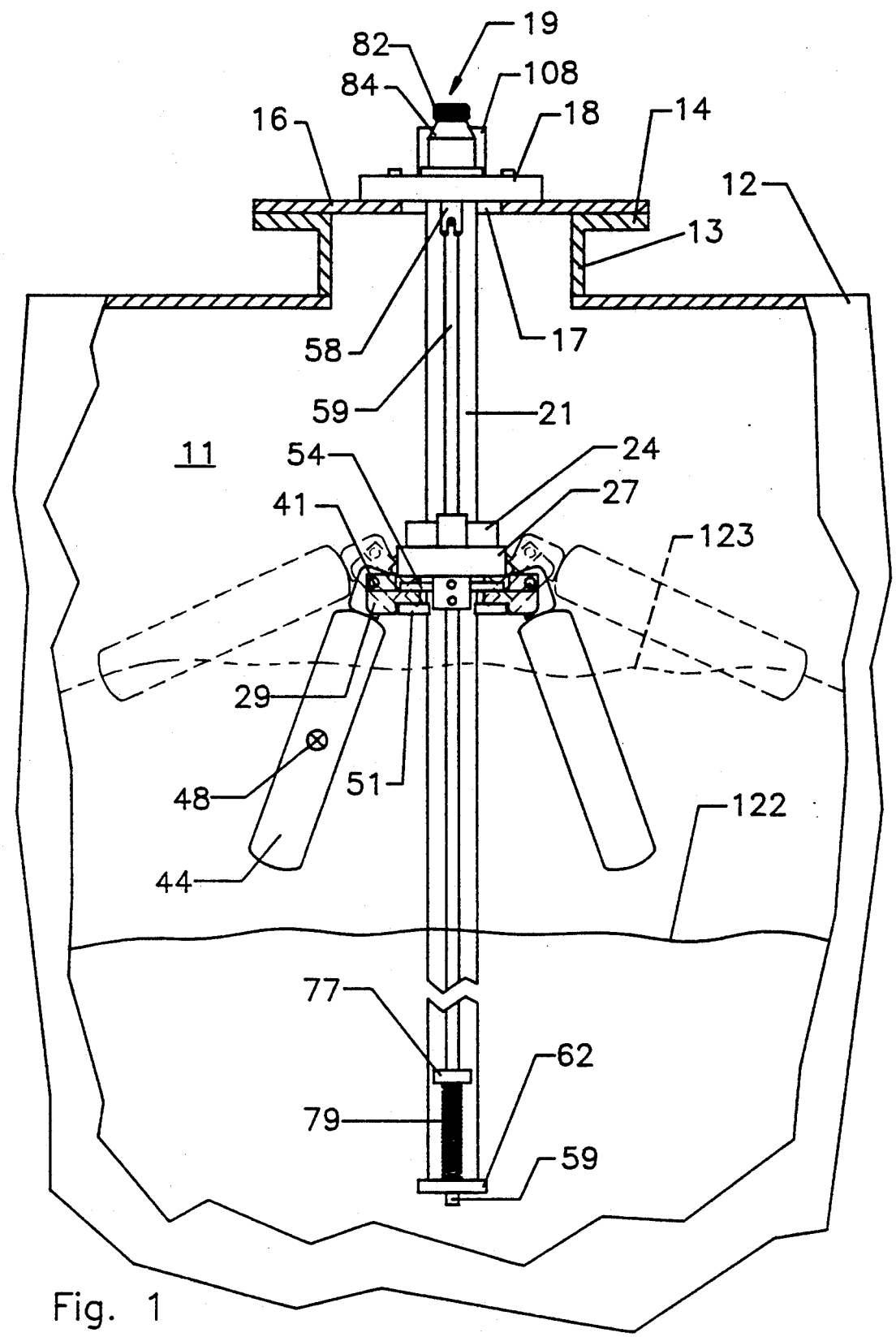
FIG. 1 is a vertical section through the liquid cargo tank in a barge and showing a two-float liquid level sensor according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, a liquid cargo holding tank 11 in the barge 12 has a top hatch opening 13 with circular flange 14 thereon. A flange lid 16 can be secured to it by hinge and latch or bolts or in any other suitable manner. There is a central aperture 17 in the lid 16 which is covered and closed by the mounting flange 18 of the liquid level sensor assembly 19 of the present invention and which is fastened to lid 16 by at least four circularly spaced cap screws.

Figure 3A:
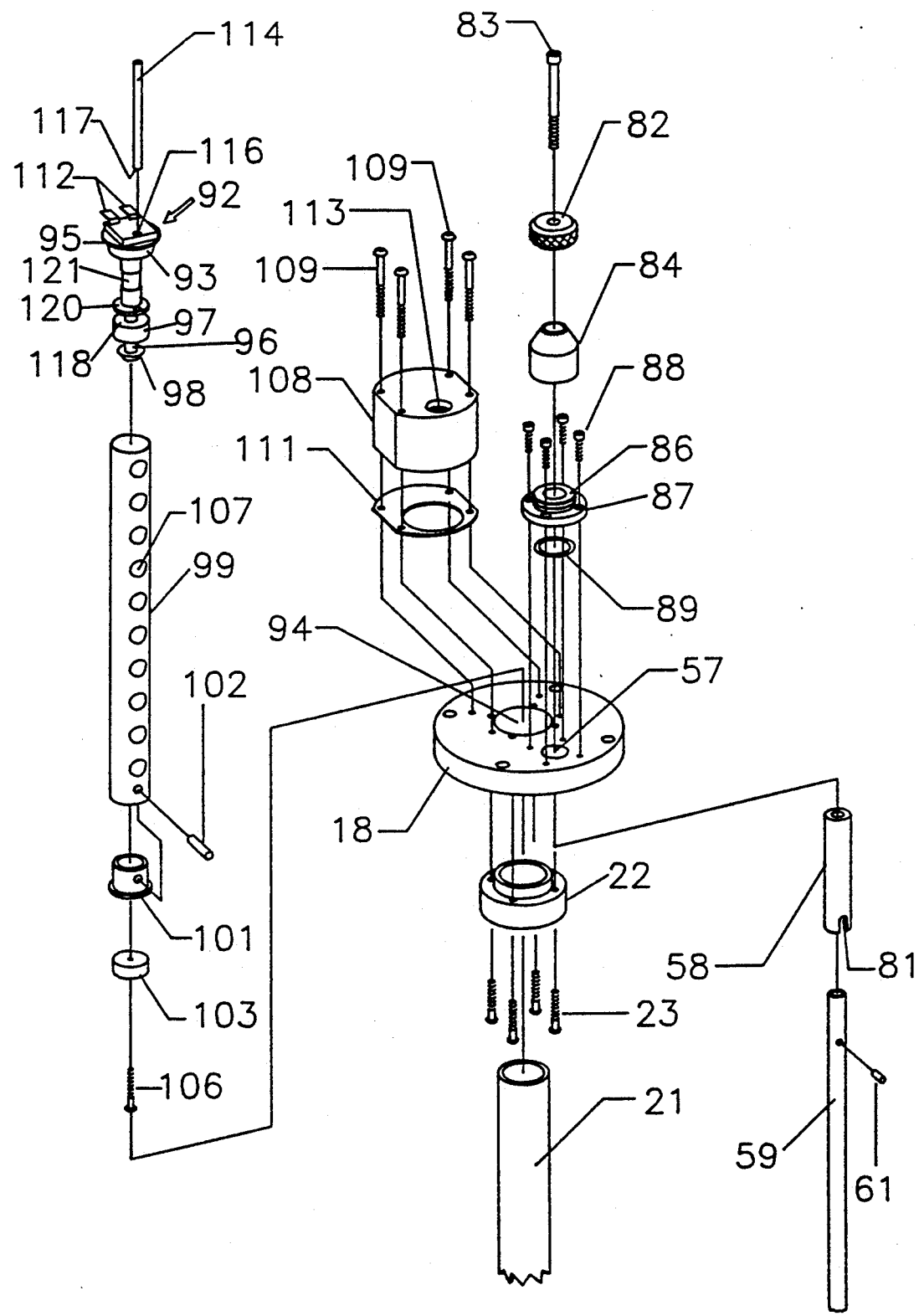
FIG. 3A is a pictorial exploded view of the upper portion of the liquid level sensor assembly.
Figure 3B:
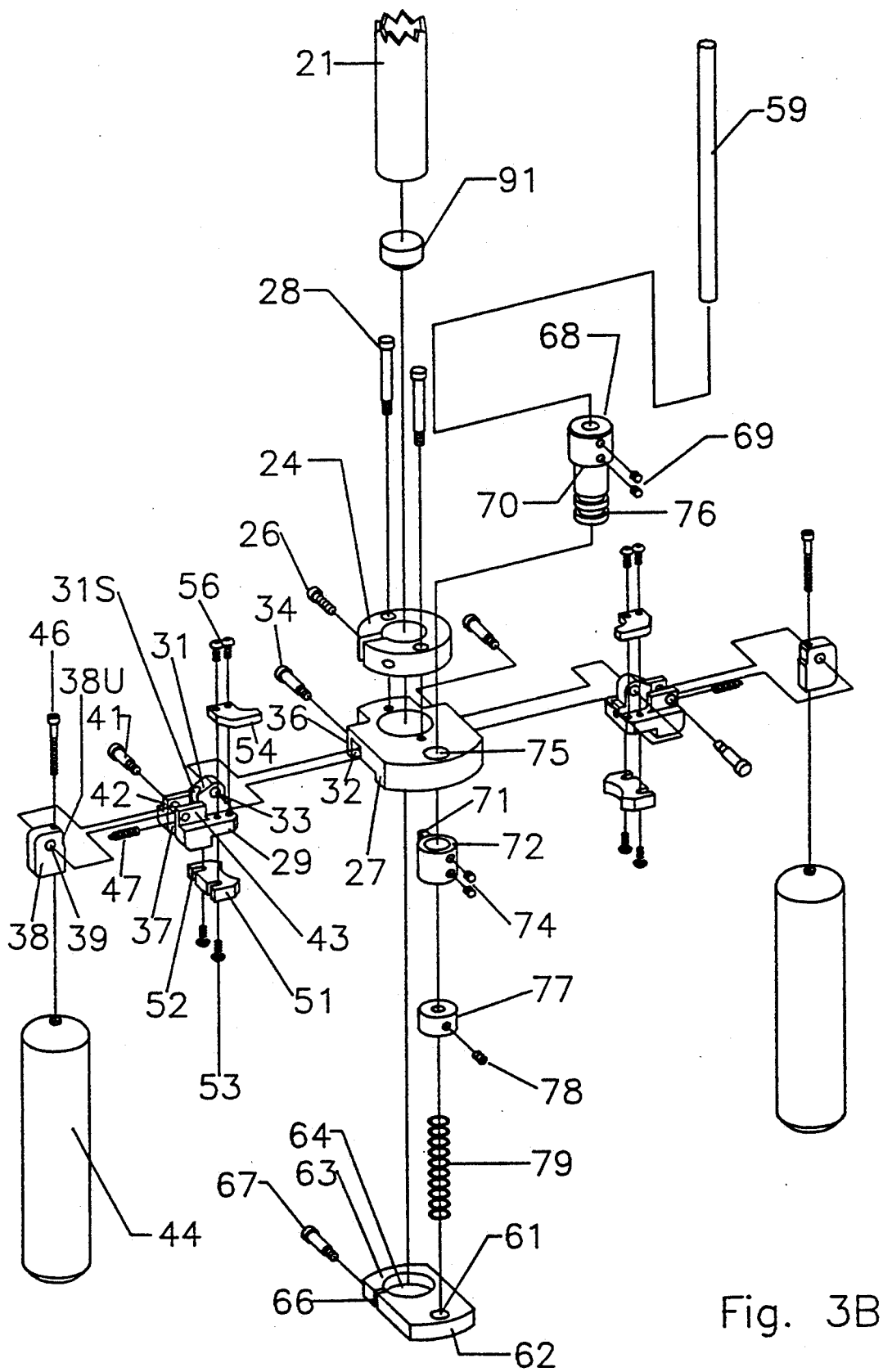
FIG. 3B is a pictorial exploded view of the lower portion of the liquid level sensor assembly.

The liquid level sensor assembly includes a centrally located pipe 21 welded to a pipe flange 22 (FIG. 3A) which is secured to the bottom of the mounting flange 18 by four cap screws 23. A float assembly positioning ring 24 (FIGS. 1 and 3B) is a split collar clamped to the pipe 21 by a cap screw 26. A float pivot mounting flange 27 abuttingly engages the bottom of collar 24 and is slidable downward relative thereto an amount limited by the heads of two shoulder bolts 28 guidingly received through collar 24 and screwed into flange 27. Two float assemblies are connected to this flange 27. Since they are essentially identical, a description of one will suffice for both.

The float pivot arm 29 has a post 31 fittingly received in a downwardly opening channel 32 in the flange 27. The post has a hole 33 through it which is a slip fit on a shoulder bolt 34 received through the far wall 36 of the flange 27 and threadedly received in the flange, whereby the pivot arm 29 is pivotably mounted to the flange. Similarly, the pivot arm itself has a yoke 37 which receives therein the pivot block 38 which has an aperture 39 therein which is a slip fit on the shoulder bolt 41 received through the wall 42 of the pivot arm and threadedly secured in the wall 43 thereof.

A hollow metal float cylinder 44 is mounted to the pivot block 38 and secured thereto by the socket head cap screw 46 received downward through an aperture in the float pivot block 38. Although the float 44 would normally hang vertically due to the free pivoting action of the pivot block 38 on the shoulder bolt shaft 41, a spring plunger 47 partially received and seated in an outwardly facing socket (not shown) in pivot arm 29 normally maintains the float at a slightly angled attitude as shown in the solid line FIG. 1 where its center of buoyancy 48 is below and outboard of the arm pivot axis 41.

A magnet 51 is provided with two outwardly opening slots 52 which receive cap screws 53 screwed into the bottom of the flange 29 to which the magnet is thereby secured. A pivot arm extension 54 is fastened to the top of the pivot arm by cap screws 56.

The mounting flange 18 has an aperture 57 which receives a connecting shaft 58 in it. This shaft is both rotatable and longitudinally slidable in aperture 57. A combination test and reset rod 59 has its upper end received in a cylindrical cavity in the lower end of the shaft 58. The lower end of rod 59 is received through an aperture 61 in a bottom flange 62 which has a split collar portion 63 with an aperture 64 through it whereby it is received on the lower end of the pipe 21. The combination of the split and a socket head cap screw 67 enables clamping this flange 62 to the pipe. A bushing 68 is fastened to the rod 59 by set screws 69. It has a downwardly facing shoulder 70 abuttingly engaging the top of flange 27 around opening 75 therein through which extends the bushing portion below shoulder 70. A test cam 71 projects inwardly toward the pipe 21 from a ring 72 to which the cam is affixed, the ring being secured to the bushing 68 by set screws 74 received in grooves 76 near the lower end of the bushing.

A set collar 77 is secured to the rod 59 by a set screw 78. A return spring 79 is compressed between the top surface of the bottom flange 62 and the underside of the set collar 77. It was mentioned above that the upper end of the rod 59 is received in a downwardly opening cavity in the connector shaft 58. This is a slip-fit, and socket head cap screw 83 keeps the rod 59 in the cavity in connector shaft 58. The extent of reception of the rod in the connector is determined by a rollpin 61 tightly received in the rod 59 and extending outward into the downwardly opening slot 81 in the connector 58. The rollpin being received in the slot 81 also dictates that when the connector 58 is rotated, so will the rod 59 be rotated.

Rotation of connector 58 and thereby rod 59 is accomplished by a knurled knob 82 fastened to the upper end of shaft 59 by the socket head cap screw 83. An elastomeric boot 84 is received under knob 82 and snugly around the upstanding boss 86 of the flange 87 secured to the top of flange 18 by cap screws 88. An 0-ring seal 89 captured under the flange 87 and on top of flange 18 provides a seal around connector 58 through which the connector can slide vertically and turn while remaining sealed.

Pipe 21 serves both as a structural member and a housing for switch operating components. The lower end of it is sealed shut by plug 91. The upper end is sealed in pipe flange 22 which is sealed to flange 18. Thus, tank contents and vapors cannot get to the components inside the pipe as will be described now.

Figure 4:
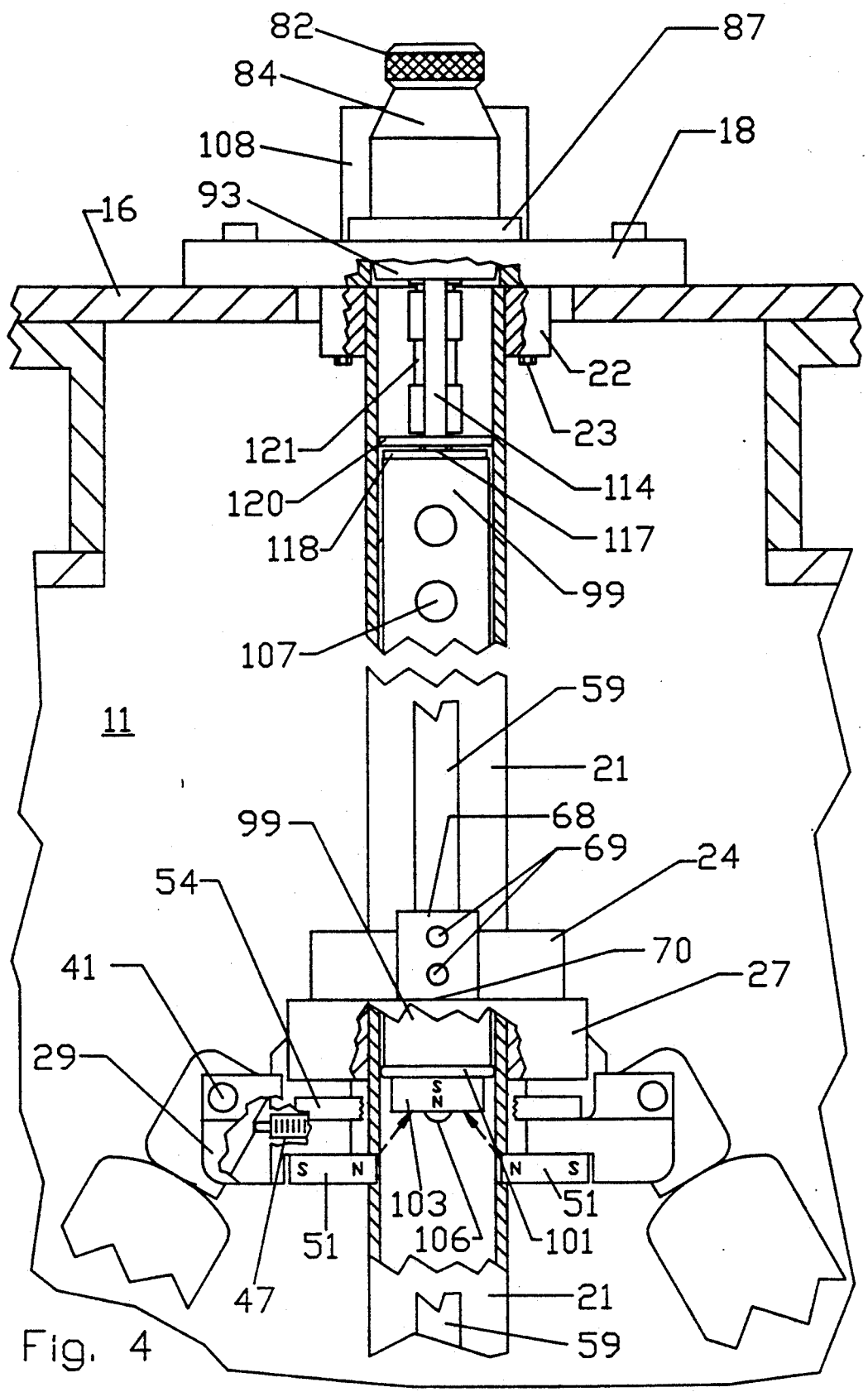
FIG. 4 is a fragment of FIG. 1 enlarged and with portions broken out to show the interior switch operating system with the floats at rest.
Figure 5:
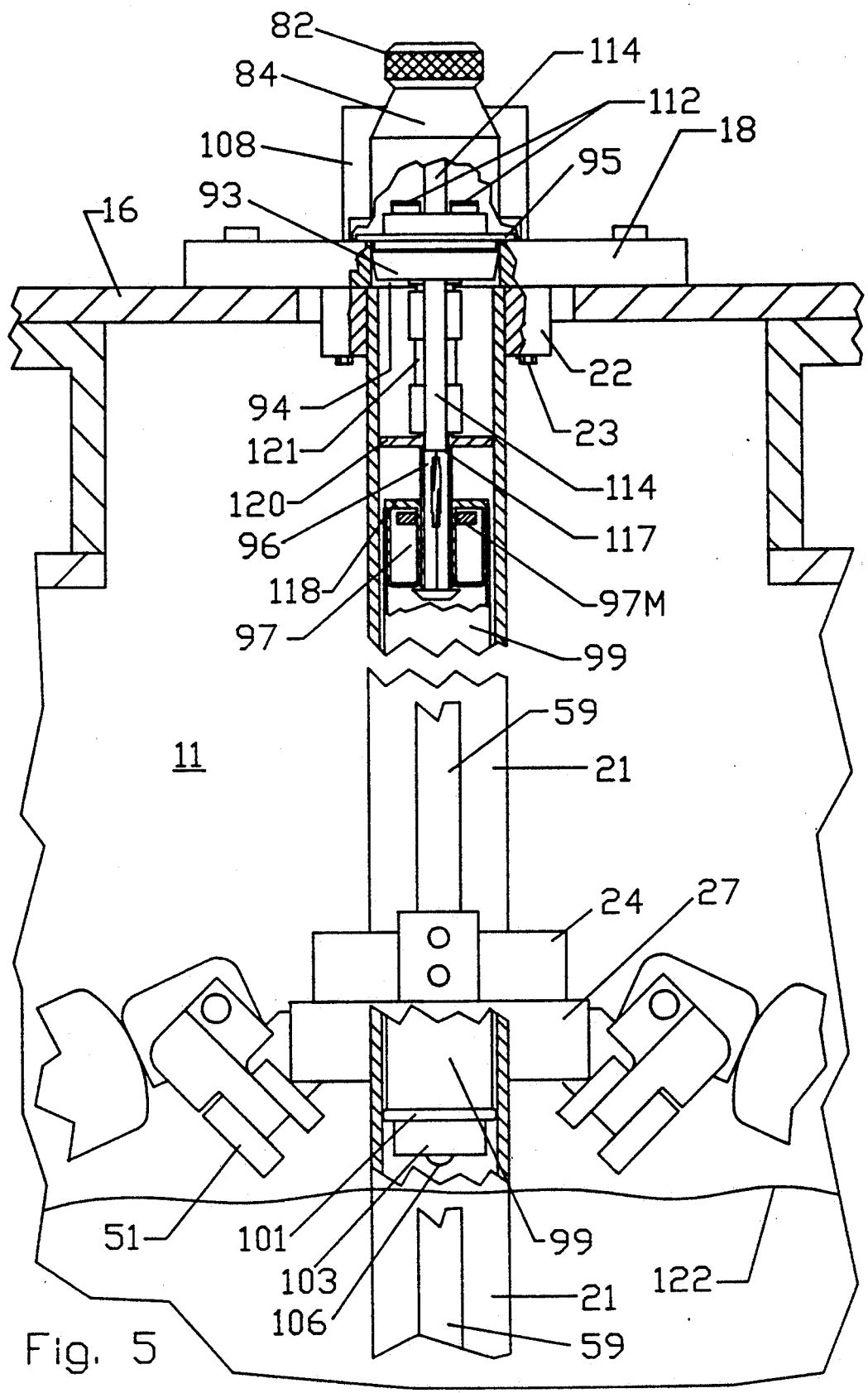
FIG. 5 is a view like FIG. 4 but with the floats in switch operating attitude.

A normally-open magnetic reed switch assembly 92 is mounted with its body 93 fittingly received in an aperture 94 in flange 18, and its mounting flange 95 received on top of and seated on flange 22. This switch assembly has a downwardly projecting guide tube 96 (FIGS. 3A and 5) for a cylindrical sliding switch-actuator collar 97 housing a ring magnet 97M fixed inside it. The collar moves vertically on guide tube 96 to magnetically close the reed switch contacts 97A and 97B when the collar is up (FIGS. 4 and 9), and permit the switch contacts to open (FIGS. 5 and 10) as the collar moves down on the guide tube toward the stop 98 fixed to the bottom of the guide tube. An extension tube 99 is received around and secured to the outer cylindrical surface of the collar 97 and extends downwardly therefrom through a portion of the length of the pipe 21. The lower end of the tube 99 receives a mounting plug 101 which is secured therein by a pin 102 with the bottom flange of the plug abutting the end of tube 99. Magnet 103 is secured to the bottom of the plug 101 by a cap screw 106. The extension tube 99 is provided with a plurality of openings 107 in the wall thereof to minimize weight. Magnet polarities are indicated by "N" and "S" legends in FIG. 4.

The upper end of the switch assembly above its mounting shoulder 95 is received in a cover 108 fastened to the flange 18 with four cap screws 109, a cover gasket being provided at 111. The cover is provided with a gasketed aperture on the far side (not shown) to receive electrical leads from the two terminals 112 of the switch. The cover is also provided with a lens 113 located immediately above the upper end of a fiberoptic rod 114 situated under the cover and secured in an opening 116 in the switch and extending down through it to a lower end 117 situated immediately above a luminous disc 118 mounted on top of the slide collar 97.

OPERATION

In the use of the apparatus, it is installed in the tank such as 11 through a hatch such as at 13. In the illustration of FIG. 1, the inside diameter of the hatch opening is less than that taken by the floats deployed as they are. To facilitate installation, the floats can be folded to the vertical attitude during installation, subsequent to which they will spring out to the altitude shown, being biased to do so by the springs 47, one on each of the two floats. They stop at that attitude due to the cradling of the upper inner wall 38U (FIG. 3B) of the float pivot block in the saddle 31S in the boss 31 of the float pivot arm 29. When in this condition, the center of buoyancy 48 of the float is 2.75 inches outboard of the pivot axis 41 of the pivot block 38 on the pivot arm 29. This enables the float to rise with the rising liquid in the tank. When the floats are down as shown in FIG. 1, the combined effects of the magnets 51 thereon on the magnet 103 is to hold magnet 103 up in the position shown in FIG. 4 where the disc 118 atop the operating collar 97 of the switch assembly is held up in the position shown in FIGS. 3A and 4, against the stop 120 at the bottom of the cylindrical body 121 of the switch assembly. The bottom of magnet 103 is about 0.375 inches above the level of the top of magnet 51 on the float pivot arm. The switch is held closed.

As the liquid rises in the tank such that the level 122 rises and the liquid begins to contact the floats, continuing rise of liquid in the tank results in the floats being lifted. As more liquid fills the tank, the surface may rise to a level such as dotted line (FIG. 1) 123 whereupon the floats are in the attitude shown in the dotted lines in FIG. 1. As this occurs, the magnet 51 fixed to the bottom of each of the float pivot arms is swung away from pipe 21 as the float forces the pivot arm 21 upward and outward about the axis 33. As the magnet 51 is pulled away from the pipe 21, the magnetic force holding magnet 103, and thereby the tube 99 and the collar 97 and disc 118 up against the stop 121, is weakened so that the assembly of magnet 103 tube 99, and collar 97 will descend until the lower face of the collar 97 engages the stop 98. As this occurs, the magnetic reed switch (97A, 97B, in FIGS. 9 and 10) in guide tube 96 of the switch assembly 92 is opened (returns to its normally-open condition) as a result of the magnet 97M in collar 97 moving away from the switch. Since this switch is in series with others in a conventional, low power barge alarm circuit (not shown herein), the opening of the switch results in activating the alarm.

The magnets 51 and their power are selected so that if either one of them moves away from the pipe 21, the magnet 103 will drop and open the switch. Therefore, in this case, even if the float 44 has leaked and is not functioning properly, the other float functioning properly will cause the switch to be opened when the level has risen to the point at which the switch is intended to be opened, thus operating an alarm or some other audible or visual signal and shutting off a fill pump, for example.

Figure 2:
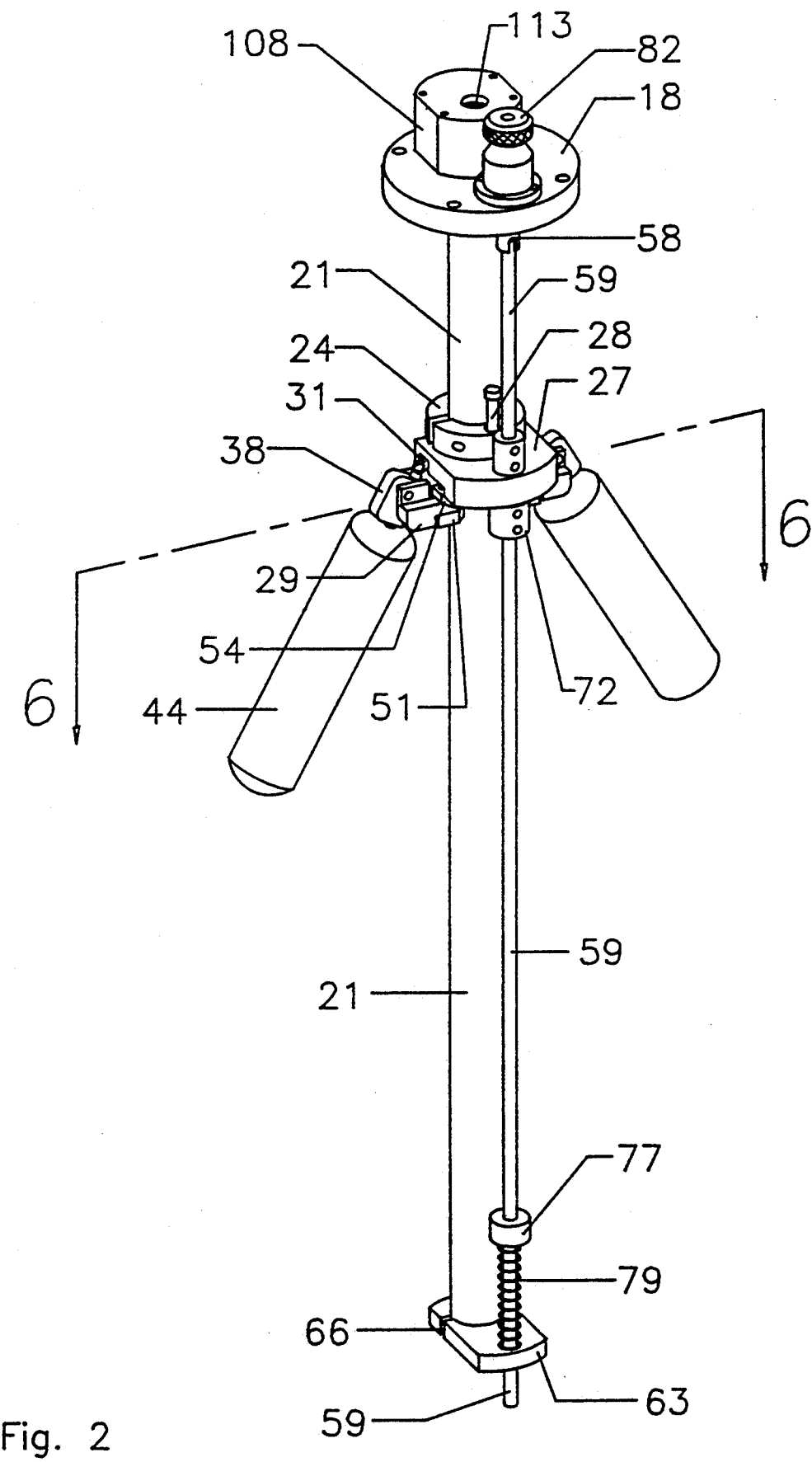
FIG. 2 is a pictorial view of the liquid level sensor assembly itself.
Figure 6:
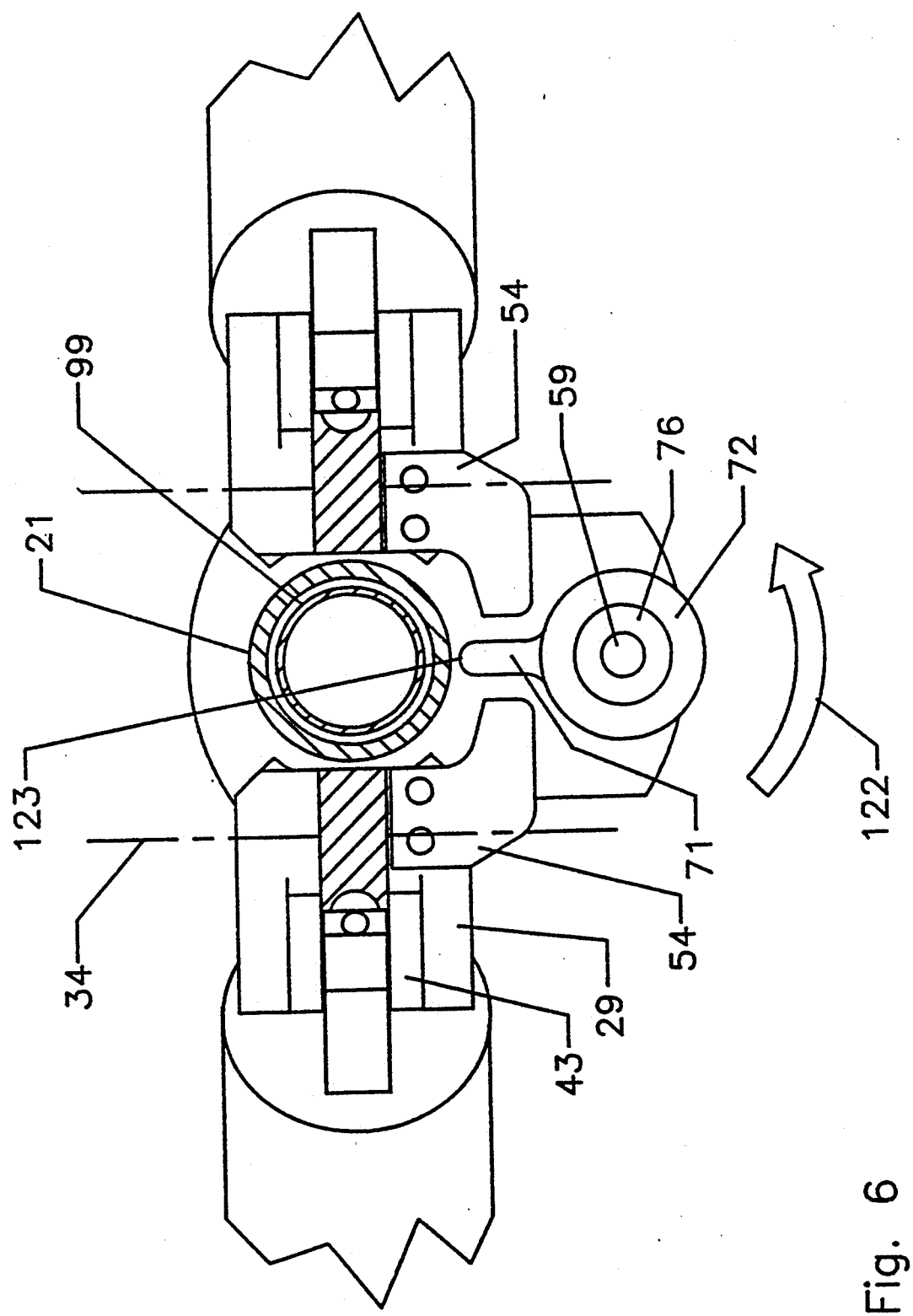
FIG. 6 is a fragmentary cross-sectional view taken at line 6—6 in FIG. 2 and viewed in the direction of the arrows.

Referring now to FIG. 6, which is a cross section taken immediately under the float pivot mounting flange 27 at line 6—6 in FIG. 2 and viewed in the direction of the arrows, there is shown the means for testing the operation of the floats. Note that the cam lug 71 on test ring 72 is immediately between the ends of the extension members 54 attached to the respective float pivot arms. Therefore, turning the knob 82 (FIG. 3A) in the counterclockwise direction of arrow 122 in FIG. 6 will push the pivot arm extension 54, and thereby the left hand pivot arm 29 outward from the support pipe axis about the pivot axis 34 to an extent such that the magnet 51 will become sufficiently disassociated with magnet 103 to permit the latter magnet 103 and the associated tube 99 and switch operating collar 97 to drop. Similarly, turning the knob 82 in the clockwise direction will cause the cam lug 71 thereof to push the right-hand float arm extension outward with respect to pipe 21 to disassociate it with the magnet and tube assembly to operate the switch. It should be understood that, after operation of the switch by turning the knob in the counterclockwise direction, the switch must be reset before turning the knob in the clockwise direction to check operation thereof in response to operation of the right-hand float assembly. In either case, when the switch is closed with the tube and magnet and collar assembly 99, 103 and 97, in the uppermost position, the bright indicator ring 118 will be disposed immediately under the lower end 117 of the fiber optic rod 114 whereupon, an operator viewing the upper end of the rod through the lens 113 will see a bright greenish "eye". In contrast, after the magnet assembly 103 has been permitted to drop as a result of pushing either of the float pivot arms outward by the testing lug 71, the bright disk 118 will move away from the lower end of the fiber optic rod whereupon the "eye" will become dim. The magnet 103, tube 99 assembly will stop when the collar 97 hits stop 98. At this point, the bottom of magnet 103 will be level with the top of magnets 51 in their "float down" position of FIGS. 1 and 4.

To reset the switch, the tube, magnet, collar assembly 99, 103 and 97 must be raised to the position where it will become abuttingly stopped by the shoulder 120. For this purpose, the knob 82 on shaft 58 is pushed down whereby reset rod 59 is pushed down. The shoulder 70 on bushing 68 thereby pushes float pivot mounting flange 27, and thereby the entire float assembly, downward 0.25 inches to the bottom limit of the travel as determined by abutment of the heads of bolts 28 against collar 24. The magnets 51 are immediately adjacent the pipe 21 and, as the float assembly is pushed down, the top of each magnet 51 travels past a level (about 0.125 inches) below the bottom of the magnet 103 such that the sum of the vertical components of the force of repulsion in the magnetic fields between each of the two magnets 51 and the magnet 103 will drive the magnet 103 upward and it will continue upward as the knob 82 is released and spring 79 returns the float assembly to engagement of flange 27 with collar 24 whereupon the magnetic field (indicated by the dotted lines in FIG. 5) established by the two float operated magnets holds magnet 103 and thereby tube 99 upward, with the stop collar 97 and disc 118 thereon against the stop 120 whereby the switch is reset. The switch is not again operated until either of the two floats is pulled away from the pipe by action of either the manual turning of the test knob 82 or by the rising level of liquid in the tank.

Due to the fact that the pipe 21 is sealed closed at the bottom by the plug 91, and at the top by the cover 108, gasket 111 and lens 113, there is no way that the tank cargo can enter pipe 21. Therefore, the operating tube 99 for the switch, and the attendant components are free from any interference from dust or the cargo contents themselves or any vapors from them.

Figure 7:
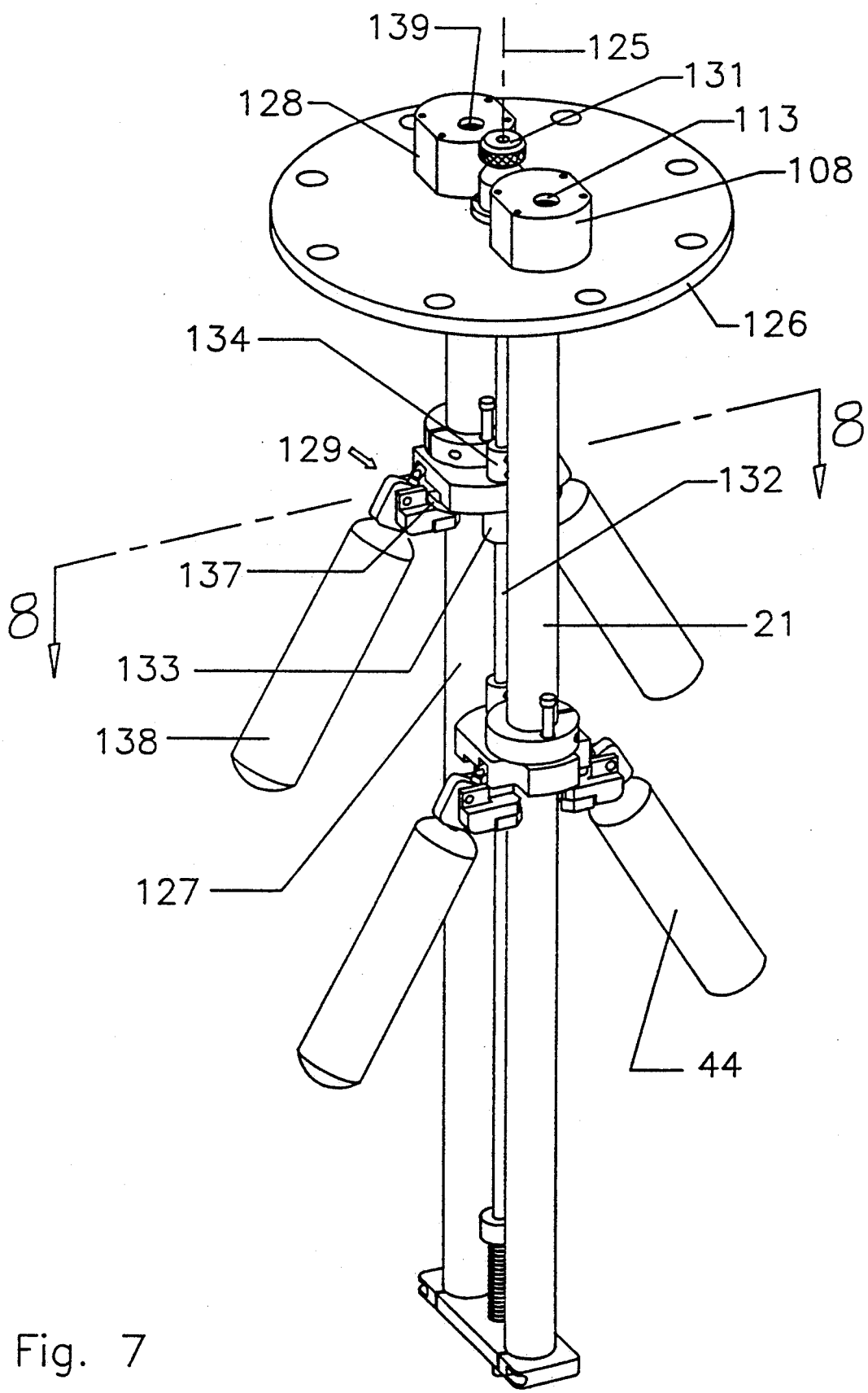
FIG. 7 is a pictorial view of a four-float combination high level sensor and overfill alarm sensor.

FIG. 7 is a pictorial view of a liquid level sensor which can function both as a high level sensor and an overfill alarm sensor. For this purpose, two pairs of floats are employed, each of them having exactly the same construction as the single pair of floats previously described. In this instance, instead of having the single support tube 21, attendant float assembly, and switch cover 108, there are two such units disposed on diametrically opposite sides of the center axis of the mounting flange 126. An identical arrangement is shown on the opposite side of the axis 125 and includes the pipe 127, cover 128, float assembly 129 and associated components. In this particular example, the float assembly 129 for the overfill sensor is located higher on the pipe 127 than is the float assembly on pipe 21 of the high level sensor. Consequently, the assembly 129 will sense an overfill condition and operate an alarm.

Figure 8:
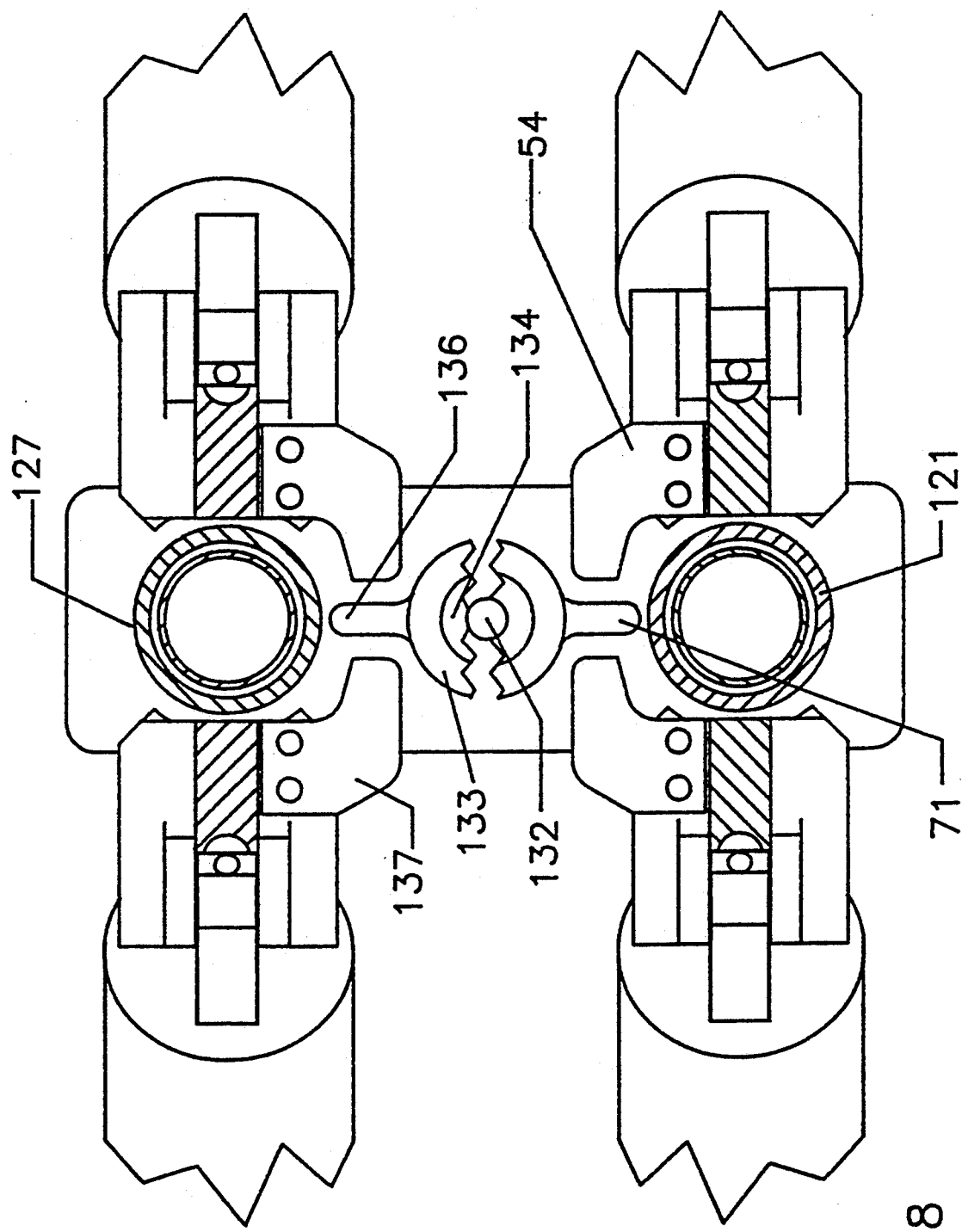
FIG. 8 is a fragmentary cross-sectional view taken at line 8—8 in FIG. 7 and viewed in the direction of the arrows.

In the embodiment of FIG. 7 a single combination test knob and reset button 131 is used. In this instance, as indicated in FIG. 8, the test operating cam lug 71 is on a ring mounted on a bushing mounted on the shaft 132, just as the ring 72 and bushing 68 are mounted on shaft 59 in the previously described figures. But in this instance, there is also a ring 133 mounted on the bottom of the lower portion of a bushing 134 mounted on the shaft 132 and with an operating cam 136. Thus, when the knob 131 is turned counterclockwise, lug 71 will operate against pivot arm extension 54 to move the lower right-hand float 44 outward. Simultaneously, the cam 136 will operate on the pivot arm extension 137 for float 138, pushing it outward. The magnets on these respective pivot arms both move away from the posts 21 and 127, respectively, whereupon the switch operating tube and magnet assemblies in the respective pipes 21 and 127 lose the support of the corresponding pivot arm mounted magnets and drop against the stop abutments, opening the respective switches. At the same time, the indicator eyes in lenses 113 of cover 108 and 139 in cover 128 go from bright to dim. Upon releasing knurled knob 137, the weight of the floats will cause them to return to their original position, as shown in FIG. 7, thus returning the cam 71 in 136 to the neutral position shown in FIG. 8. Then, the reset knob is pushed downward to reset the switches. Then, upon turning the knob in the clockwise direction, the cams 71 and 136 will operate the other two floats with the attendant operation of the switches controlled by these two floats. Releasing the knob will again permit it to return to the neutral position under the influence of the floats re-settling to their original position, as just described with reference to the other two floats. Pushing the knob downward will reset the switches.

The features of the liquid level sensor which are exposed to the contents of the cargo hold are made of either stainless steel, of the non--magnetic variety, or of a low friction plastic such as a Teflon ® brand plastic for pivot bearings.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A float-operated switch assembly comprising:
 a first support mountable at an opening in the top of a tank;
 a float mount connected to the first support;
 a float pivotally mounted to the float mount to pivot relative to the mount about a horizontal axis upward from a normal rest position;
 a switch;
 a switch controller associated with the float and normally holding the switch in one switched condition when the float is down, but operable to change the switch condition when the float has floatably pivoted upward;
 a manual test grip above the first support and coupled to the float to manually pivot the float upward to change the switched condition; and
 a shaft connected to the grip and extending downward below the first support and having a cam thereon associated with the float such that, when the grip is rotated the cam operates the float to pivot the float upward.

2. A float-operated switch assembly comprising;
 a first support mountable at an opening in the top of a tank;
 a float mount connected to the first support;
 a float pivotally mounted to the float mount to pivot relative tot he mount about a horizontal axis upward from a normal rest position;
 a switch;
 a switch controller associated with the float and normally holding the switch in one switched condition when the float is down, but operable to change the switch condition when the float has floatably pivoted upward;
 a switch operator support magnet;
 the controller including a control magnet associated with the float and normally in a position proximate the support magnet when the float is down and establishing a magnetic field between the control magnet and the support magnet to normally hold the support magnet in a set position keeping the switch in the one switched condition.

3. The assembly of claim 2 and further comprising:
 an indicator associated with the switch to show when the switch has been actuated.

4. The assembly of claim 3 and further comprising:
 a fiber optic rod associated with the indicator and observable outside the tank during a test procedure to show when the switch has been actuated.

5. The assembly of claim 2 and further comprising:
 a vertical guide secured to the first support and extending downward therefrom;
 the float mount being spaced below the first support and slidable vertically along the guide;
 reset device including a manipulator above the first support and connected to the float mount and manually operable from above the first support after the controller has changed switch condition, to slide the float mount downward along the guide and thereby move the control magnet associated with the float downward to a position proximate the support magnet re-establishing a magnetic field between the control magnet and the support magnet such as to return the support magnet to the set position keeping the switch in the one switched condition.

6. The assembly of claim 5 and further comprising:

a second float pivotally mounted to the float mount to pivot relative to the mount about a horizontal axis upward from a normal rest position;

the controller including a second control magnet associated with the second float and normally in a position proximate the support magnet when the second float is down and establishing a magnetic field between the second control magnet and the support magnet to normally cooperate with the first control magnet to hold the support magnet in a set position keeping the switch in the one switched condition.

7. The assembly of claim 6 and wherein:

the control magnets are sized and located such as to require both control magnets to be in the said proximate positions to hold the support magnet in the set position.

8. The assembly of claim 7 and wherein:

the guide is a vertical non-magnetic pipe secured to the plate;

the support magnet is inside the pipe; and the control magnets are outside the pipe.

9. The assembly of claim 8 and wherein:

the pipe is closed and is sealed to the first support precluding communication of fluid from below the first support to the interior of the pipe; and the switch is a magnetic reed switch.

10. A float-operated switch assembly comprising:

a support plate mountable at an opening in the top of a tank;

a vertical non-magnetic pipe secured to the support plate and extending downward therefrom;

a float mounting plate spaced below the support plate and slidable vertically along the pipe;

a float pivotally mounted to the float mounting plate to pivot relative to the mounting plate upward from a normal rest position;

a switch operator support magnet;

a control magnet associated with the float and normally in a position proximate the pipe when the float is down and establishing a magnetic field between the control magnet and the switch operator support magnet to normally hold the support magnet in a set position.

11. The assembly of claim 10 and wherein: the switch operator support magnet is located inside the pipe.

12. The assembly of claim 11 and further comprising:

a float pivot arm pivotally mounted to the float mounting plate to pivot relative to the mounting plate about a horizontal axis, the control magnet being fixed to the float pivot arm.

13. The assembly of claim 11 and further comprising:

a switch coupled to the switch operator support magnet;

a tank of liquid receiving the float therein;

the float being located in the tank at a height such that, when the liquid has risen to the desired upper limit, the rising liquid has caused the float to swing up and outward from the pipe, pulling the control magnet out of supporting relationship to the switch operator support magnet whereupon the support magnet drops and the switch is operated to effect a signal circuit.

14. The assembly of claim 13 and further comprising:

a manual test manipulator coupled to the float to manually lift the float.

15. The assembly of claim 14 and further comprising:

an indicator on the switch to show when the switch has been operated;

a fiber optic rod associated with the indicator and observable outside the tank during a test procedure to show when the switch has been operated.

16. The assembly of claim 13 and further comprising:

a second vertical non-magnetic pipe secured to the support plate and extending downward therefrom;

a second float mounting plate spaced below the support plate and slidable vertically along the second pipe;

a second float pivotally mounted to the second float mounting plate to pivot from a normal rest position upward about a horizontal axis;

a second switch operator support magnet;

a second switch coupled to the second switch operator support magnet;

a second control magnet associated with the second float and normally in a position proximate the second pipe when the second float is down and establishing a magnetic field between the second control magnet and the second switch operator support magnet to normally hold the second switch operator support magnet in a set position;

the second float rest position being lower in the tank than the first float rest position to cause the operation of the second switch when the liquid level is at a lower level in the tank than that at which the first float causes operation of the first switch.

17. The assembly of claim 16 and wherein:

the manual test manipulator is coupled to the second float to manually lift the second float.

18. The assembly of claim 17 and wherein:

the couplings of the manipulator to the first mentioned float and second float are independent whereby the first mentioned float can be lifted independent of the second float.

* * * * *